UNITED STATES PATENT OFFICE.

ARNOLD DANIEL, OF CHARLOTTENBURG, GERMANY.

METHOD OF PRODUCING CARAMEL.

1,316,019.     Specification of Letters Patent.    Patented Sept. 16, 1919.

No Drawing.     Application filed August 11, 1917. Serial No. 185,792.

*To all whom it may concern:*

Be it known that I, ARNOLD DANIEL, a subject of the King of Roumania, residing at Charlottenburg, near Berlin, in the German Empire, have invented a new and Improved Method of Producing Caramel, of which the following is a specification.

My invention relates to an improved method of producing caramel, which consists in heating carbohydrates, preferably starch, syrup, grape-sugar (glucose), fruit-sugar, beet-root sugar, milk-sugar, molasses or treacle and the like with acetic acid, while adding substances capable of withdrawing or eliminating water, such as acetic anhydrid, acetate of sodium or mineral that is inorganic acids. Besides the said water eliminating substances others may also be used, as far as the same are not able to paralyze or abolish the action of the acetic acid. The acetic acid and the water eliminating means may be used in any desired proportion; however, the tinctorial power of the obtained caramel is the smaller the lower are the quantities of acetic acid and water eliminating means employed in carrying out the method forming the object of the present invention.

My improved method may for instance be performed in the following ways, either in an open vessel with or without a reflux-cooler or in a closed vessel while using pressure, as the working conditions shall render it preferable in each case.

*Example I.*

In an enameled iron vessel provided with a reflux-cooler are dissolved in a solution of 10 kilogr. of acetic acid (99%) and 10 kilogr. of acetate of sodium freed from water 100 kilogr. of beet-root sugar in a water-free condition and the resulting solution is boiled for 6 to 8 hours. Thereafter the caramel is precipitated from the solution by means of sodium carbonate or hydroxid.

By using twice the above stated quantity of acetic acid and of acetate of sodium the tinctorial power of the caramel is enhanced to nearly double.

The caramelizing process may also be carried out with the help of acetic acid alone, when the carbohydrates contain ash. As for the rest of the process, the mode of operation corresponds to the working described in the preceding first example.

The time necessary for the reaction may be shortened by heating the solution under superatmospheric pressure.

If no cooler be used, an addition of free acetic acid is superfluous.

If desired, the caramelizing process may also be performed by heating the carbohydrates, with acetate of sodium alone, since on melting the carbohydrate, organic acids are formed by the decomposition of the carbohydrate, so that said organic acids liberate a part of the acetic acid from the acetate of sodium.

*Example II.*

100 kilogr. of beet-root sugar are melted in an iron vessel, then 10 to 20 kilogr. of acetate of sodium are added, while intermixing the mass. The melting temperature varies between 160 and 170° C. As soon as the desired coloration of the produced caramel is attained, the reaction is interrupted by addition of water.

The caramel obtained in the described manner is easily soluble in water and alcohol and colors rum, brandy and liquors without any dulling taking place.

Having thus fully described my invention, what I claim and desire to secure by Letters Patent of the United States is:—

1. The herein described method of producing caramel, which consists in heating a caramelizable carbohydrate with acetic acid.

2. A method of producing caramel, which consists in heating a caramelizable carbohydrate with acetic acid in a closed vessel under pressure.

3. A process of producing caramel which comprises heating a caramelizable carbohydrate with acetic acid and a dehydrating agent.

4. A process of producing caramel which consists in heating a caramelizable carbohydrate with acetic acid and an acetate.

5. A method of producing caramel which consists in heating a caramelizable carbohydrate with acetic acid and sodium acetate.

6. The herein described method of producing caramel, which consists in heating beet-root sugar with acetic acid.

7. The method of producing caramel which comprises heating beet-root sugar with acetic acid in a closed vessel under pressure.

8. A method of producing caramel, which consists in heating beet-root sugar with acetic acid in a closed vessel under pressure.

9. A process of producing caramel which comprises heating beet-root sugar with acetic acid and a dehydrating agent.

10. A process of producing caramel which consists in heating beet-root sugar with acetic acid and an acetate.

11. A method of producing caramel which consists in heating beet-root sugar with acetic acid and sodium acetate.

12. The method of producing caramel, which consists in heating together a solution of beet-root sugar, acetic acid and sodium acetate in a closed vessel, while under pressure, and precipitating the caramel from the reaction product by adding sodium carbonate thereto.

In witness whereof I have hereunto set my hand.

ARNOLD DANIEL.